(12) United States Patent
Zhang et al.

(10) Patent No.: US 9,967,508 B2
(45) Date of Patent: May 8, 2018

(54) DEVICE FOR REMOTELY CONTROLLING ELECTRIC EQUIPMENT

(71) Applicant: THOMSON LICENSING, Issy les Moulineaux (FR)

(72) Inventors: Ren Zhang, Beijing (CN); Qi Li, Beijing (CN)

( * ) Notice: Subject to any disclaimer, the term of this patent is extended or adjusted under 35 U.S.C. 154(b) by 131 days.

(21) Appl. No.: 14/915,235

(22) PCT Filed: Aug. 27, 2013

(86) PCT No.: PCT/CN2013/082381
§ 371 (c)(1),
(2) Date: Feb. 27, 2016

(87) PCT Pub. No.: WO2015/027398
PCT Pub. Date: Mar. 5, 2015

(65) Prior Publication Data
US 2016/0212368 A1    Jul. 21, 2016

(51) Int. Cl.
*H04N 5/44* (2011.01)
*G06F 3/0489* (2013.01)
(Continued)

(52) U.S. Cl.
CPC ......... *H04N 5/4403* (2013.01); *G06F 3/0233* (2013.01); *G06F 3/0235* (2013.01);
(Continued)

(58) Field of Classification Search
CPC ............... H04N 5/4403; H04N 5/4482; H04N 21/4221; H04N 21/42225;
(Continued)

(56) References Cited

U.S. PATENT DOCUMENTS

| 7,855,347 B2 * | 12/2010 | Kato | ...................... H01H 13/88 200/310 |
|---|---|---|---|
| 2003/0030573 A1 | 2/2003 | Ure | |

(Continued)

FOREIGN PATENT DOCUMENTS

| CN | 101256443 A | 9/2008 |
|---|---|---|
| CN | 101615079 A | 12/2009 |

(Continued)

OTHER PUBLICATIONS

880-Harmony-Remote-User-Manual, pp. 1-15, v. 1.2 Feb. 16, 2007 http://www.logitech.com/assets/44638/4/harmony880-user-guide.pdf).

(Continued)

*Primary Examiner* — Ali Neyzari
(74) *Attorney, Agent, or Firm* — Meagher Emanuel Laks Goldberg & Liao, LLP.

(57) ABSTRACT

The present invention relates to a device for remotely controlling electric equipment. For example, the device has a plurality of buttons, the plurality of buttons are configured to make one closed loop. A plurality of outside colored portions extend along outside of at least two adjacent buttons, the color of each outside colored portion is different from each other. A plurality of inside colored portions extend along inside of at least two adjacent buttons, the color of each inside colored portion is different from each other. A predetermined function is allocated to a series of buttons indicated by the corresponding inside or outside colored portion. In addition, the device may have a controller to recognize a command and sends the command to the electric equipment, wherein the controller recognizes the allocated function as the command when the buttons corresponding to the colored portion for the allocated function are stroked in predetermined direction in series.

9 Claims, 4 Drawing Sheets

(51) Int. Cl.
*H04N 21/422* (2011.01)
*H04N 5/445* (2011.01)
*G06F 3/023* (2006.01)

(52) U.S. Cl.
CPC ........ *G06F 3/0489* (2013.01); *G06F 3/04895* (2013.01); *H04N 5/44582* (2013.01); *H04N 21/4221* (2013.01); *H04N 21/42225* (2013.01); *H04N 2005/4408* (2013.01); *H04N 2005/4412* (2013.01)

(58) Field of Classification Search
CPC ... H04N 2005/4412; H04N 2005/4408; H04N 5/44; H04N 5/4401; H04N 5/45; H04N 21/4532; H04N 21/4858; H04N 21/488; H04N 21/8133; H04N 21/42204; H04N 21/482; H04N 21/42224; H04N 5/44852; G06F 3/0402; G06F 3/0489; G06F 3/04895; G06F 3/0233
USPC ..................................................... 340/12.22
See application file for complete search history.

(56) References Cited

U.S. PATENT DOCUMENTS

2003/0048897 A1    3/2003    Luo
2009/0133997 A1    5/2009    Kato et al.
2011/0095987 A1    4/2011    Yoshimoto

FOREIGN PATENT DOCUMENTS

EP    2339821 A1    6/2011
JP    2001257610 A    9/2001
KR    2009119184 A    11/2009

OTHER PUBLICATIONS

Heberle, Von Klaus, "TV Operation Movement Instead of a Multitude of Keys", Funkschau, 1989, pp. 128-132.

* cited by examiner

100

DEVICE FOR REMOTELY CONTROLLING ELECTRIC EQUIPMENT

This application claims the benefit, under 35 U.S.C. § 365 of International Application PCT/CN2013/082381, filed Aug. 27, 2013, which was published in accordance with PCT Article 21(2) on Mar. 5, 2015 in English.

FIELD OF THE INVENTION

The present invention relates to a device for controlling electric equipment. More particularly, the present invention relates to Remote Controller, which could be used in STB Set Top Box) or any other media player equipment.

BACKGROUND OF THE INVENTION

Recently, various functions of STB or any other media player equipment have been developing, and therefore the number of operation buttons of Remote Controller is increasing.

On normal Remote Controller, multiple buttons are used to indentify all functions to control all operations on STB or other media player equipment. When adding other control functions, more buttons would be necessary to be installed. This makes Remote Controller too big, and hard to operate when trying to find specific function. Also the large amount of buttons increase the cost, damage possibility, steep learning curve, and unfriendly human interface.

In order to resolve the defects mentioned above, the invention provides users with more simple and easier controlling topology on Remote Controller, which requires less button. The invention provides a friendly human interface.

As related art, EP2339821A1 and KR2009119184A disclose Remote Controller for controlling electric equipment.

SUMMARY OF THE INVENTION

According to an aspect of the present invention, there is provided a device for remotely controlling an electric equipment, the device comprising: a plurality of buttons, all buttons are configured to make one closed loop; a plurality of outside colored portions extending along outside of at least two adjacent buttons, the color of each outside colored portion is different each other; and a plurality of inside colored portions extending along inside of at least two adjacent buttons, the color of each inside colored portion is different each other; wherein a predetermined function is allocated to a series of buttons indicated by corresponding inside or outside colored portion; the device further comprising: a controller to recognize a command and send the command to the electric equipment, wherein the controller recognizes the allocated function as the command when the buttons corresponding to the colored portion for the allocated function are stroked in predetermined direction in series.

According to another aspect of the present invention, there is provided a device for remotely controlling electric equipment, the device comprising: a plurality of pairs of buttons to perform adverse function, wherein one of the pairs of buttons is opposed to the other, all buttons are configured to make one ring; a plurality of outside colored portions making one ring located outside of the ring of the buttons, wherein the number of the outside colored portions is equal to or less than half number of the all buttons, the color of each outside colored portion is different each other; and a plurality of inside colored portions making one ring located inside of the ring of the buttons, wherein the number of the inside colored portions is equal to or less half number of the all buttons, the color of each inside colored portion is different each other; wherein each of the inside and outside colored portions extends to cover maximum number of the buttons, a predetermined function is allocated to each of the inside and outside colored portions; the device further comprising: a controller to recognize a command and send the command to the electric equipment, wherein the controller recognizes the allocated function as the command when the buttons corresponding to the colored portion for the allocated function are stroked in predetermined direction.

BRIEF DESCRIPTION OF DRAWINGS

These and other aspects, features and advantages of the present invention will become apparent from the following description in connection with the accompanying drawings in which.

DETAILED DESCRIPTION OF PREFERRED EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

Figure 1:
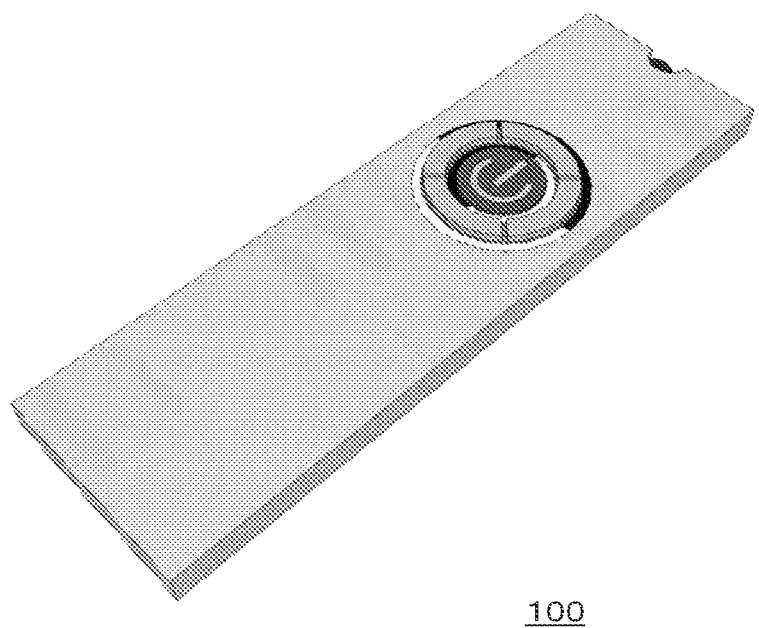
FIG. 1 shows an exemplary perspective view illustrating a device according to an embodiment of the present invention.

FIG. 1 shows a device in accordance with an embodiment of the present invention. A remote controller 100 can be used for controlling an electric equipment such as STB and any other media player equipment.

Figure 2:
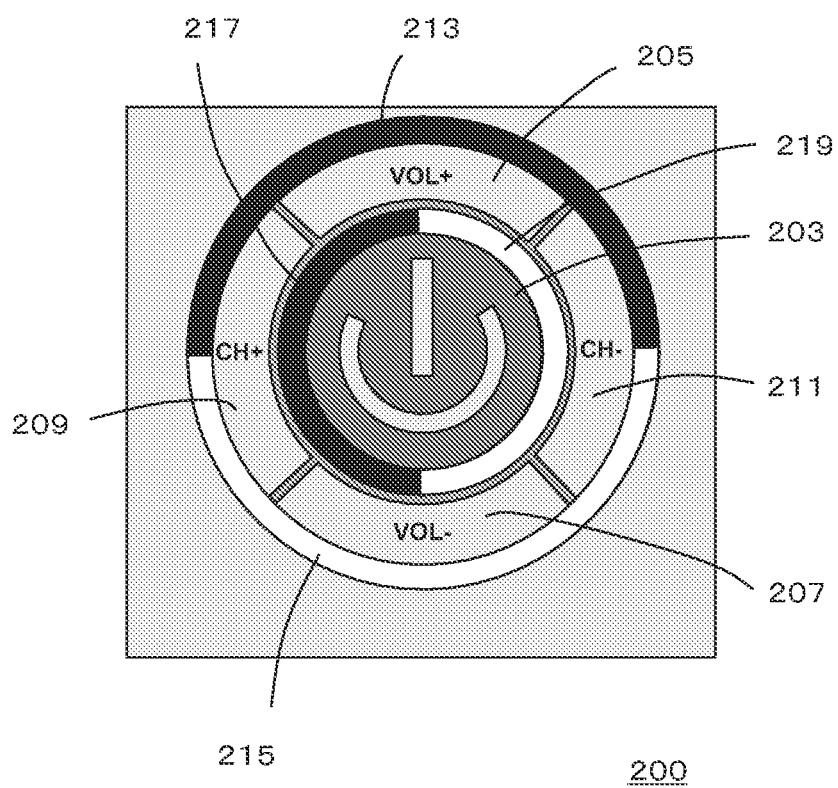
FIG. 2 shows an exemplary view illustrating an operation unit according to an embodiment of the present invention.

FIG. 2 shows controlling portion 200 of the remote controller 100 shown in FIG. 1. On remote controller 100 of STB, volume/channel adjustment/selection, On/Standy functions are the most frequent used operations. Volume adjustment button 205 in which "VOL+" is described is used to turn the volume up by pressing or touching itself. Volume adjustment button 207 in which "VOL−" is described is used to turn the volume down by pressing or touching itself. Channel selection button 209 in which "CH+" is described is used to change the channel number in increasing direction by pressing or touching itself. Channel selection button 211 in which "CH−" is described is used to change the channel number in decreasing direction by pressing or touching itself. On/Standby button 203 is used to wakeup electric equipment to be controlled by pressing or touching itself. In this example, when the On/Standby button 203 is pressed with 2 seconds long, it makes the electric equipment standby state. The long press could avoid mistake press and false operation.

As described above, the remote controller 100 uses each button for corresponding function, which makes it easy, simple and direct for user to operate.

Also, the On/Standby button acts as Menu call on OSD (On-Screen Display) during STB normal state. OSD menu will be used to call all other control actions of STB, which is easy to read and select. During this, 4-way buttons 205, 207, 209, 211 will act as UP/Down, Left/Right control on OSD menu.

Figure 3:
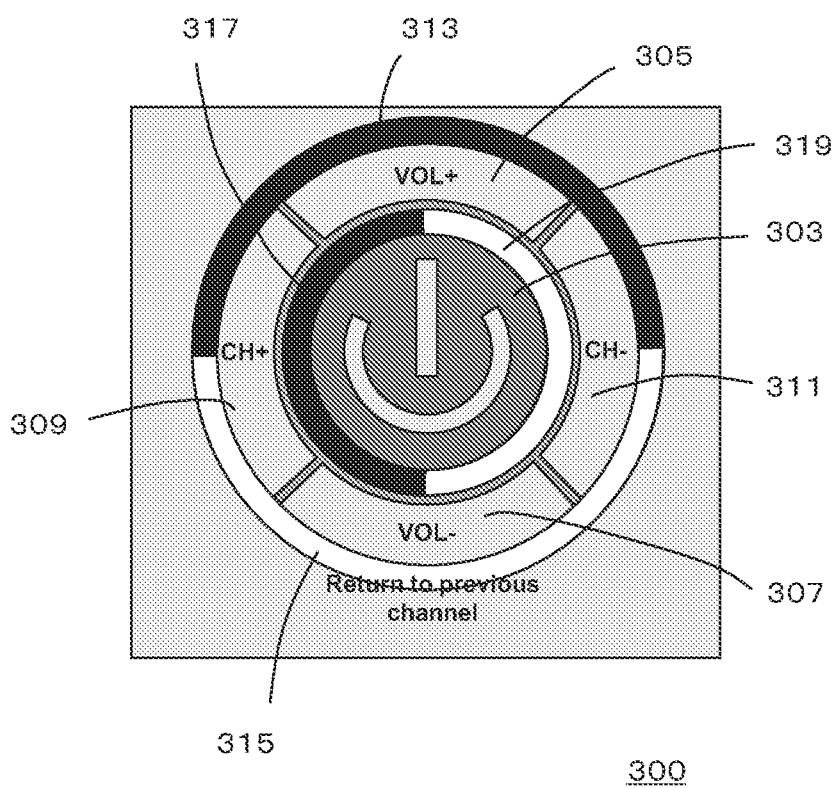
FIG. 3 shows an exemplary view illustrating an operation unit according to another embodiment of the present invention.

The 4 buttons of "VOL+" 205, "VOL−" 207, "CH+" 209, and "CH−" 211 are used for quick-to-use route to control functions of the remote controller 100. For this quick-to-use route, button-stroke-series are used. As described in FIG. 3, in order to be visualized, 4 half colored rings 313, 315, 317, 319 are printed inside and outside of the 4-way button ring consisting of 4 buttons 305, 311, 307, 309 to indicate button stroke order. Stroke order of 3 buttons are used to avoid false operations during normal usage. Also allocated function prompt would be printed on corresponding half colored ring, easier for user to indentify. In FIG. 3, <<Return to previous channel>> is printed on outside half white colored ring 315.

All operations are clockwise button press/touch sequence to avoid confuse. However, other direction could be predetermined.

If the user needs STB to return to previous channel, the user would find such prompt words printed on the outside half white colored ring 315, which means "CH−→VOL−→CH+".

Four quick functions could be invoked via this controlling topology:

Outside Black Colored ring 313: Function 1 "CH+→VOL+→CH−";
Outside White Colored ring 315: Function 2 "CH−→VOL−=CH+";
Inside Black Colored ring 317: Function 3 "VOL−→CH+→VOL+";
Inside White Colored ring 319: Function 4 "VOL+→CH−→VOL−";

A user can stroke the each colored ring clockwise by pressing/touching the corresponding buttons in accordance with the order.

This controlling topology makes remote controller 100 of STB or any other Media Player concise and intuitive. This user interface is much easier for users.

In the above embodiment, since the frequent used buttons consists of four operations, that is, "VOL+", "VOL−", "CH+", and "CH−", four quick functions are available by four half colored rings. However the number of quick functions could be equal to or less than half number of the frequent used buttons. The number of the frequent used buttons is dependent on the device.

The device could include a plurality of pairs of buttons to perform adverse function. The one button of the pairs is opposed to the other. All of the buttons are configured to make one ring.

A plurality of outside colored portions making one ring is located outside of the ring of the buttons. The number of the outside colored portions is equal to or less than half number of the all buttons. The color of each outside colored portion is different each other.

A plurality of inside colored portions making one ring is located inside of the ring of the buttons. The number of the inside colored portions is equal to or less than half number of the all buttons. The color of each inside colored portion is different each other.

Each of the inside and outside colored portions extends to cover maximum number of the buttons. A predetermined function is allocated to each of the inside and outside colored portions.

In another embodiment, the device comprising: a plurality of buttons, all buttons are configured to make one closed loop; a plurality of outside colored portions extending along outside of at least two adjacent buttons, the color of each outside colored portion is different each other; and a plurality of inside colored portions extending along inside of at least two adjacent buttons, the color of each inside colored portion is different each other; wherein a predetermined function is allocated to a series of buttons indicated by corresponding inside or outside colored portion; the device further comprising: a controller to recognize a command and send the command to the electric equipment, wherein the controller recognizes the allocated function as the command when the buttons corresponding to the colored portion for the allocated function are stroked in predetermined direction in series.

In the embodiment, the buttons configured to make one closed loop. In other words, the buttons are not necessary to make a ring/circle. The shape of the closed loop is not limited to any specific figures. A plurality of inside and outside colored portions extend along inside and outside of at least two adjacent buttons. Each of the plurality of the inside and outside colored portions could make one closed loop. However it is not necessary to make one closed loop.

Figure 4:
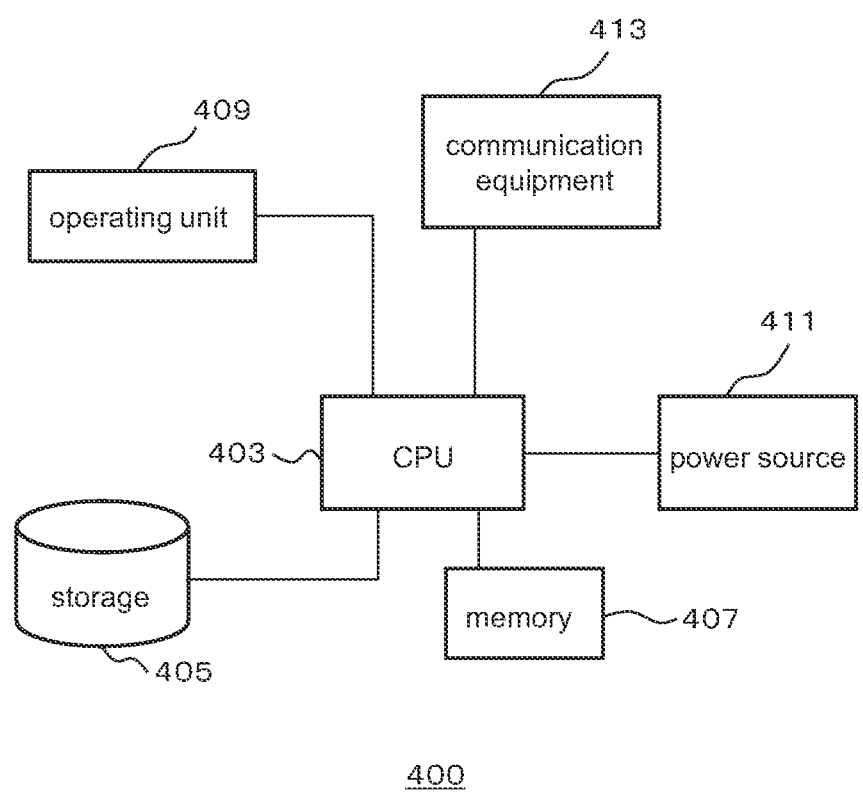
FIG. 4 shows an exemplary block diagram illustrating a system according to an embodiment of the present invention.

FIG. 4 illustrates an exemplary block diagram of a device 400 according to an embodiment of the present invention. The device 400 can be a remote controller, or all ESD protection RF module devices. The device 400 comprises a CPU (Central Processing Unit) 403, an operating unit 409, a storage 405, a power source 411, and a communication equipment 413. A memory 407 such as RAM (Random Access Memory) may be connected to the CPU 403 as shown in FIG. 4.

The storage 405 is configured to store software programs and data for the CPU 403 to drive and operate the processes to send commands input by a user to STB or any other media player equipment.

The communication equipment 413 is configured to send commands input by a user to STB or other media player equipment. The communication equipment 413 may be infrared communication equipment. Alternatively, the communication equipment 413 can send command to a central system controlling all of home appliances.

The device 400 can instruct any appliances such as STB, TV sets, and so on.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code.

The various processes and functions described herein may be either part of the microinstruction code or part of the application program, or any combination thereof, which may be executed by a CPU. In addition, various other peripheral units may be connected to the computer platform such as an additional data storage unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A device for remotely controlling an electric equipment, the device comprising:
a plurality of buttons configured to make one closed loop;
a plurality of outside colored portions extending along outside of at least two adjacent buttons of the plurality of buttons, each outside colored portion has a different color; and
a plurality of inside colored portions extending along inside of at least two adjacent buttons of the plurality of buttons, each inside colored portion has a different color;
wherein a predetermined function is allocated to a series of buttons of the plurality of buttons indicated by the corresponding inside or outside colored portion;
the device further comprising:
a controller configured to recognize a command and send the command to the electric equipment, wherein the controller recognizes the allocated function as the command when the buttons corresponding to the corresponding colored portion for the allocated function are stroked in a predetermined direction in series.

2. The device according to claim 1, wherein the allocated function is printed on the corresponding colored portion.

3. The device according to claim 1, further comprising an on/standby button in inside of a ring marked by the inside colored portions, wherein the on/standby button acts as a menu call for OSD (On-Screen Display).

4. The device according to claim 1, wherein the predetermined direction is clockwise.

5. A device for remotely controlling an electric equipment, the device comprising:
a plurality of buttons having two pairs of buttons, wherein each pair of the buttons have two buttons which are positioned opposed to each other and perform adverse function of each other, the plurality of buttons are configured to make one ring;
a plurality of outside colored portions making one ring located outside of the ring of the plurality of buttons, wherein number of the outside colored portions is equal to or less than half number of the plurality of buttons, each outside colored portion has a different color; and
a plurality of inside colored portions making one ring located inside of the ring of the plurality of buttons, wherein number of the inside colored portions is equal to or less than half number of the plurality of buttons, each inside colored portion has a different color;
wherein each of the inside and outside colored portions extends to cover a maximum number of the plurality of buttons, a predetermined function is allocated to a series of buttons indicated by the corresponding inside or outside colored portion;
the device further comprising:
a controller configured to recognize a command and send the command to the electric equipment, wherein the controller recognizes the allocated function as the command when the buttons corresponding to the colored portion for the allocated function are stroked in predetermined direction in series.

6. The device according to claim 5, wherein the allocated function is printed on the corresponding colored portion.

7. The device according to claim 5, wherein functions of the two pairs of buttons are adjusting volume up and down, and changing channel number in decreasing direction and increasing direction.

8. The device according to claim 5, wherein the device further comprising an on/standby button in inside of the ring marked by the inside colored portions, wherein the on/standby button acts as a menu call for OSD (On-Screen Display).

9. The device according to claim 5, wherein the predetermined direction is clockwise.

* * * * *